(12) United States Patent
Prabhakar et al.

(10) Patent No.: US 10,904,945 B2
(45) Date of Patent: Jan. 26, 2021

(54) REDUCED SIGNALING ASSOCIATED WITH ACTIVATION AND DEACTIVATION OF A MODE OF OPERATION OF A MOBILE DEVICE

(71) Applicant: APPLE INC., Cupertino, CA (US)

(72) Inventors: Alosious Pradeep Prabhakar, Singapore (SG); Vijay Venkataraman, San Jose, CA (US); Zay Yar Lin, Nakano (JP)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 16/157,715

(22) Filed: Oct. 11, 2018

(65) Prior Publication Data

US 2020/0120748 A1 Apr. 16, 2020

(51) Int. Cl.
*H04W 76/30* (2018.01)
*H04W 76/10* (2018.01)

(52) U.S. Cl.
CPC .......... *H04W 76/30* (2018.02); *H04W 76/10* (2018.02)

(58) Field of Classification Search
None
See application file for complete search history.

(56) References Cited

U.S. PATENT DOCUMENTS

2016/0212795 A1\* 7/2016 Chang ................... H04W 76/32

\* cited by examiner

*Primary Examiner* — Kouroush Mohebbi
(74) *Attorney, Agent, or Firm* — Fay Kaplun & Marcin, LLP

(57) ABSTRACT

A device and method for a user equipment (UE) to reduce signaling with a network by conditionally barring the transmission of a particular signal to the network. The UE determines that a first predetermined condition related to radio conditions between the UE and the first cell is satisfied. The UE determines whether to activate a first mode of operation or a second mode of operation based on a second predetermined condition. The first mode of operation includes transmitting a signal that is intended to cause the release of a bearer between the UE and a packet data network (PDN). The second mode of operation includes barring the transmission of the signal that is intended to cause the release of the bearer between the UE and the PDN.

20 Claims, 4 Drawing Sheets

REDUCED SIGNALING ASSOCIATED WITH ACTIVATION AND DEACTIVATION OF A MODE OF OPERATION OF A MOBILE DEVICE

BACKGROUND

A user equipment (UE) may be configured to establish a connection to at least one of a plurality of different networks or types of networks. To establish the connection and access the full scope of services normally available to the UE via the network connection, the UE may camp on a cell of the corresponding network. However, due to a variety of different factors, the UE may activate a mode of operation that limits the access to a particular service that is normally available to the UE via the network connection.

Activating and deactivating a mode of operation that limits the access to a particular service may include an exchange of a plurality of signals between the UE and the network. Under conventional systems, the UE may activate this mode of operation despite it being likely that the UE will soon be triggered to deactivate this mode of operation. Similarly, the UE may deactivate this mode of operation despite it being likely that the UE will soon be triggered to reactivate this mode of operation. Accordingly, the UE may get stuck in a cycle of performing signaling that is intended to limit access to a particular service, performing signaling that is intended to establish access to the particular service and then performing signaling that is once again intended to limit access to the particular service. The excessive signaling performed by the UE due to activating and deactivating this mode of operation may increase power consumption.

SUMMARY

According to an exemplary embodiment, a method may be performed by a user equipment (UE) configured to camp on a first cell to establish a connection to a first network. The method includes determining a first predetermined condition related to radio conditions between the UE and the first cell is satisfied. The method further includes, determining whether to activate a first mode of operation or a second mode of operation based on a second predetermined condition. The first mode of operation includes transmitting a signal that is intended to cause the release of a bearer between the UE and a packet data network (PDN). The second mode of operation includes barring the transmission of the signal that is intended to cause the release of the bearer between the UE and the PDN.

According to another exemplary embodiment, a user equipment (UE) includes a transceiver configured to establish a connection to a first network via a first cell. The UE further includes a processor configured to perform operations. The operations comprising determining that a first predetermined condition related to radio conditions between the UE and the first cell is satisfied. The operations further comprising, determining whether to activate a first mode of operation or a second mode of operation based on a second predetermined condition. The first mode of operation includes transmitting a signal that is intended to cause the release of a bearer between the UE and a packet data network (PDN). The second mode of operation includes barring the transmission of the signal that is intended to cause the release of the bearer between the UE and the PDN.

According to a further exemplary embodiment, an integrated circuit has circuitry configured to establish a connection to a first network via a first cell. The integrated circuit further includes circuitry configured to determine that a first predetermined condition related to radio conditions between the UE and the first cell is satisfied. The integrated circuit further includes circuitry configured to determine whether to activate a first mode of operation or a second mode of operation based on a second predetermined condition. The first mode of operation includes transmitting a signal that is intended to cause the release of a bearer between the IC and a packet data network (PDN). The second mode of operation includes barring the transmission of the signal that is intended to cause the release of the bearer between the IC and the PDN.

DETAILED DESCRIPTION

Figure 1:
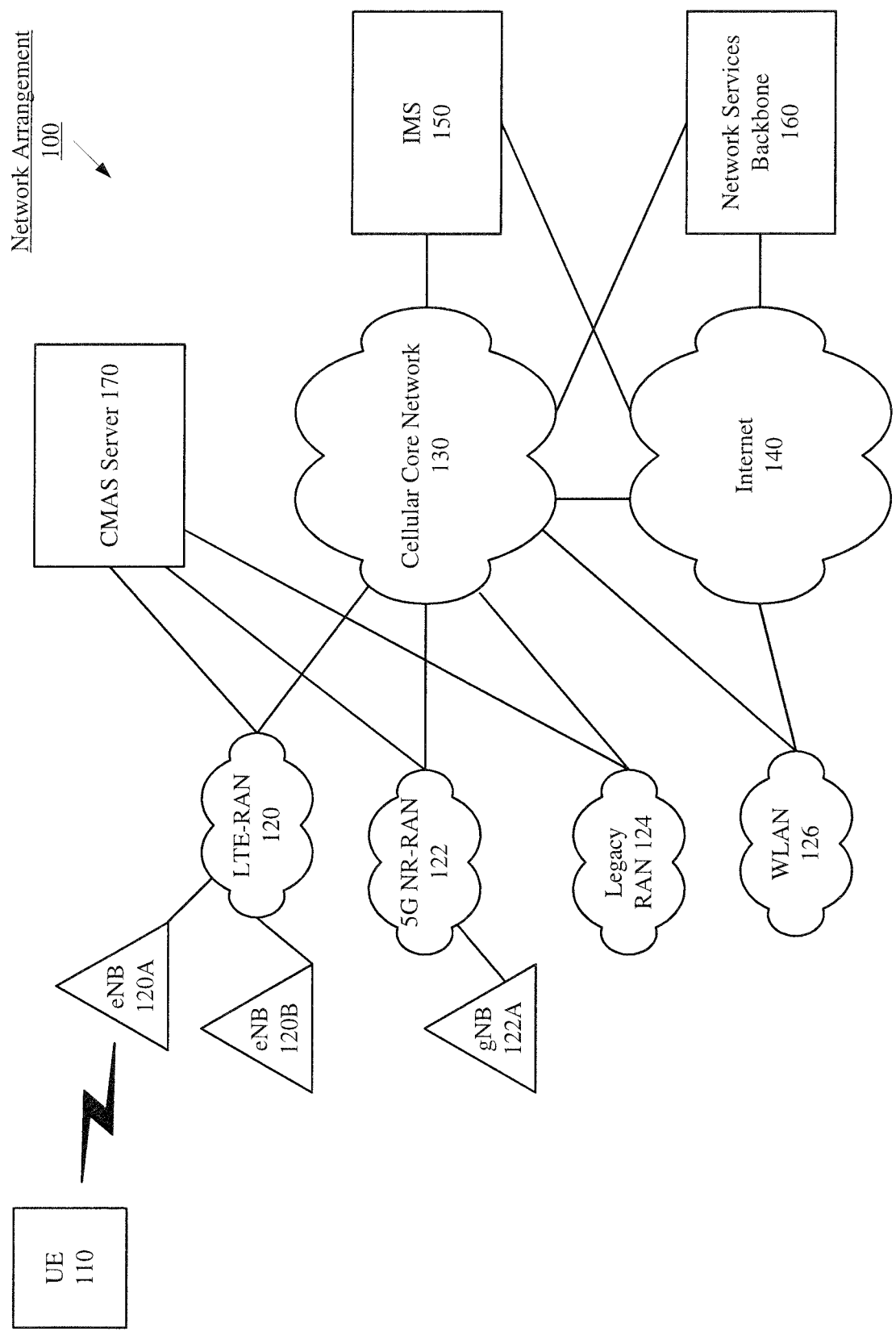
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments describe an apparatus, system and method for a UE to reduce signaling with a network by conditionally barring the transmission of a particular signal to the network. For example, prior to the transmission of the particular signal, the UE may identify conditions that correspond to excessive signaling. As a result, the UE may bar the transmission of the particular signal to the network. Transmission of the particular signal may resume when it is determined that the UE is unlikely to perform excessive signaling with the network.

The exemplary embodiments are described with regard to a UE. However, the use of term UE is merely for illustrative purposes. The exemplary embodiments may be utilized with any electronic component that may establish a connection with a network and is configured with hardware, software, and/or firmware to exchange signals with the network. Therefore, the UE as described herein represents any electronic component.

The UE may establish the connection to the network by camping on a cell of the network. In one example, the network may be a Long Term Evolution (LTE) network and the cell may be an Evolved Node B (eNB). In another example, the network may be a 5G new radio (NR) network and the cell may be a next generation Node B (gNB). However, reference to a particular network or a particular type of cell is merely provided for illustrative purposes. Those skilled in the art will understand that the network may be any type of network and the cell may be any type of cell within the corresponding network.

The UE may be configured to camp on a cell of a corresponding network via a plurality of different mechanisms including but not limited to, cell reselection and handover. Throughout this description, reference to the UE being configured to camp on a cell of the corresponding network based on any particular mechanism is merely provided for illustrative purposes. The exemplary embodiments may apply to a UE that is configured to camp on a particular cell via any appropriate mechanism.

Further, the UE may be configured to collect measurement data corresponding to the currently camped cell. The measurement data may be a factor in a variety of different operations and/or mechanisms. The measurement data may be based on a single measurement, based on a plurality of measurements, derived from a measurement, derived from a plurality of measurements or based on a combination thereof. Throughout this description, any reference to a particular type of measurement or data is merely provided for illustrative purposes, the exemplary embodiments may apply to the UE collecting any type of measurement or data.

When configured to camp on a cell, the UE may exchange a plurality of signals with the corresponding network to establish access to particular services via the network connection. For example, internet protocol (IP) connectivity may be available to the UE via the network connection. This may include access to multimedia services such as, but not limited to, voice over LTE (VoLTE), short message service (SMS), multimedia message service (MMS), video messages, streaming audio, streaming video, packet-based communications, etc. The multimedia services may be transported through the network via a communication path between the UE and an IP multimedia subsystem (IMS). However, reference to the IMS is merely exemplary. A person of ordinary skill in the art would understand that multimedia services may be made available to the UE from any type of packet data network (PDN).

Throughout this description, the communication path between the UE and the IMS may be referred to as a bearer. Establishing the bearer may include assigning the UE an IP address. The bearer may exist until the UE initiates the release of the bearer or the network triggers the release of the bearer. However, reference to the term bearer is merely provided for illustrative purposes. The exemplary embodiments may apply to any type of communication path between the UE and an entity that provides the UE access to a particular multimedia service. Further, reference to a single bearer is merely exemplary, the UE may be simultaneously configured with a plurality of bearers between the UE and the IMS and/or a different entity.

The UE may activate a mode of operation that limits access to a particular service. For example, the UE may collect measurement data corresponding to the currently camped cell. The measurement data, at least in part, may trigger the UE to activate a power efficient mode of operation that is intended to decrease power being used by the UE when the UE is within an environment that offers poor radio frequency (RF) conditions. The exemplary embodiments will be described with regard to the UE activating and deactivating a power efficient mode of operation during which emergency messages or indications of emergency messages are processed while access to other services (e.g., multimedia) may be limited. The emergency messages may be provided by a Commercial Mobile Alert System (CMAS) or an Earthquake and Tsunami Warning Service (ETWS). Accordingly, throughout this description, this power efficient mode of operation may be referred to as CMAS mode. However, this is merely exemplary, as there may be other types of power efficient modes and similar modes of operation may be referred to by different names.

In CMAS mode, the UE may limit various operations including but not limited to the processing of non-critical/background data traffic and the processing of foreground/user initiated traffic. For example, incoming data may be analyzed and only emergency related data may be used for subsequent processing while non-emergency related data may be ignored or buffered for later use.

Activating and deactivating CMAS mode, may include an exchange of various signals between the network and the UE. For example, activating CMAS mode may include but is not limited to, the UE sending a request to the network to disconnect the UE from the IMS and release the bearer. Without a bearer the UE may not have access to multimedia services. Thus, activating CMAS mode may release the bearer and cause access to particular services (e.g., multimedia, VoLTE, etc.) to be unavailable. This may prevent an increased amount of power from being utilized by the UE when the UE is operating in poor RF conditions. Alternatively, deactivating CMAS mode may include, but is not limited to, the UE sending a request to the network to establish the bearer between the UE and the IMS. Accordingly, deactivating CMAS mode may restore access to services (e.g. multimedia, VoLTE, etc.) that were limited during CMAS mode.

In conventional operations, the UE may be triggered to activate CMAS mode despite it being likely that the UE will soon deactivate CMAS mode. Similarly, the UE may be triggered to deactivate CMAS mode despite it being likely that the UE will soon reactivate CMAS mode. As a result, the UE may get stuck in a cycle of activating/deactivating CMAS mode which may cause the UE to perform excessive signaling. For example, consider a scenario where the UE is at the edge of a cell's coverage area where the radio conditions fluctuate rapidly between poor radio conditions and adequate radio conditions. When in poor radio conditions the UE may trigger CMAS mode and cause the bearer between the UE and the IMS to be torn down. The radio conditions may then recover and the UE may be triggered to deactivate CMAS mode and perform signaling that establishes a bearer between the UE and the IMS. Subsequently, the radio conditions may degrade and the UE may be triggered to reactivate CMAS mode and perform signaling that tears down the bearer that was just established between the UE and the IMS. This cycle may continue relatively frequently causing excessive signaling between the UE and the cell due to activating/deactivating CMAS mode. Thus, the power saving resulting from CMAS mode are squandered because of the excessive signaling performed by the UE.

The exemplary embodiments may relate to a UE that is configured to identify when excessive signaling is likely to occur and alters the operation of the UE to prevent the excessive signaling. Throughout this description, this altered mode of operation may be referred to as enhanced CMAS mode. In enhanced CMAS mode, the UE may utilize the same power saving mechanisms utilized in CMAS mode except unlike CMAS mode, the UE may bar the transmission of signals that are intended to cause the bearer between the UE and the IMS to be released. For example, in either CMAS mode or enhanced CMAS mode the UE may utilize power saving mechanisms including but not limited to, limiting the processing of non-critical/background data traffic, limiting the processing of foreground/user initiated traffic, analyzing incoming data and only using emergency data for subsequent processing, analyzing incoming data and ignoring non-emergency related data, analyzing incoming data and buffering non-emergency related data for later use, etc. However, unlike CMAS mode, in enhanced CMAS mode the UE will bar the transmission of signals that are intended to cause a tear down of the bearer. Thus, in enhanced CMAS mode, from the UE perspective the UE is operating in CMAS mode. From the network perspective, the bearer between the UE and the IMS still exists. Accordingly, if the UE is in enhanced CMAS mode and the IMS transmits signals over the bearer to the UE, the UE may ignore the signals transmitted by the IMS.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate directly with one or more networks. In the example of the network configuration 100, the networks with which the UE 110 may wirelessly communicate are a LTE radio access network (LTE-RAN) 120, a 5G New Radio (NR) radio access network (5G NR-RAN) 122, a legacy radio access network (RAN) 124 and a wireless local access network (WLAN) 126. However, it should be understood that the UE 110 may also communicate with other types of networks and the UE 110 may also communicate with networks over a wired connection. Therefore, the UE 110 may include a LTE chipset to communicate with the LTE-RAN 120, a 5G NR chipset to communicate with the 5G NR-RAN 122, a legacy chipset to communicate with the legacy RAN 124 and a WLAN chipset to communicate with the WLAN 126.

The LTE-RAN 120, the 5G NR-RAN 122 and the legacy RAN 124 may be portions of cellular networks that may be deployed by cellular providers (e.g., Verizon, AT&T, Sprint, T-Mobile, etc.). These networks 120, 122, 124 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 126 may include any type of wireless local area network (WiFi, Hot Spot, IEEE 802.11x networks, etc.).

The UE 110 may connect to the LTE-RAN 120 via an evolved Node B (eNB) 120A, 120B. Those skilled in the art will understand that any association procedure may be performed for the UE 110 to connect to the LTE-RAN 120. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific base station (e.g., the eNB 120A of the LTE-RAN 120). As mentioned above, the use of the LTE-RAN 120 is for illustrative purposes and any type of network may be used. For example, the UE 110 may also connect to the 5G NR-RAN 122 via the next generation Node B (gNB) 122A.

In addition to the networks 120, 122, 124 and 126 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

The network arrangement 100 may further include a CMAS server 170. The CMAS server 170 may generate emergency messages and/or emergency message indications (e.g., pings) to be broadcast over the cellular networks 120, 122, 124 to the UE 110. Since the CMAS messages are only broadcast over a cellular network, to comply with various regulations and/or standards the UE 110 may remain connected, in some manner, to a cellular network, even when the UE 110 has established a connection to a non-cellular network such as the WLAN 126. Thus, the CMAS server 170 may broadcast the emergency messages only over the cellular networks 120, 122, 124 and not the WLAN 126.

The exemplary embodiments may relate to the UE 110 activating and deactivating CMAS mode. Consider an exemplary scenario where the UE 110 is camped on the eNB 120A. The UE 110 may initiate an attach procedure to gain access to the multimedia services that may be available to the UE 110 via the IMS 150. The attach procedure may include the UE 110 and the LTE-RAN 120 exchanging a plurality of signals to establish a bearer between the UE 110 and the IMS 150 through the LTE-RAN 120. As mentioned above, establishing the bearer may include the UE 110 registering with the IMS 150 and the UE 110 being assigned an IP address for IP communications.

The UE 110 may be triggered to activate CMAS mode for any of a variety of different reasons. Activating CMAS mode may include the UE 110 sending a signal to a network that requests that the bearer between UE 110 and the IMS 150 be released. This signal may be referred to as a packet data network (PDN) disconnect request. Further, the UE 110 may send an IMS deregistration message to the network that requests that the UE 110 no longer be registered with the IMS 150 for IP connectivity. Both the PDN disconnect request and the IMS deregistration message are intended to cause a tear down of the bearer between the UE 110 and the IMS 150 and thus, terminate the communication path in which the UE 110 may access multimedia services. When in CMAS mode, the UE 110 may be triggered to deactivate CMAS mode. This may include the UE 110 sending a PDN connectivity request that is intended to establish a bearer between the UE 110 and the IMS 150. This may also include the UE 110 sending an IMS registration message to the LTE-RAN 120.

Reference to a PDN connect/disconnect request and an IMS registration/deregistration message are merely provided for illustrative purposes. Different networks may refer to similar signals by different names. The exemplary embodiments may apply to any type of signal that is intended to limit the access to a particular service (e.g. multimedia) that is normally available to the UE 110 via the network connection.

Figure 2:
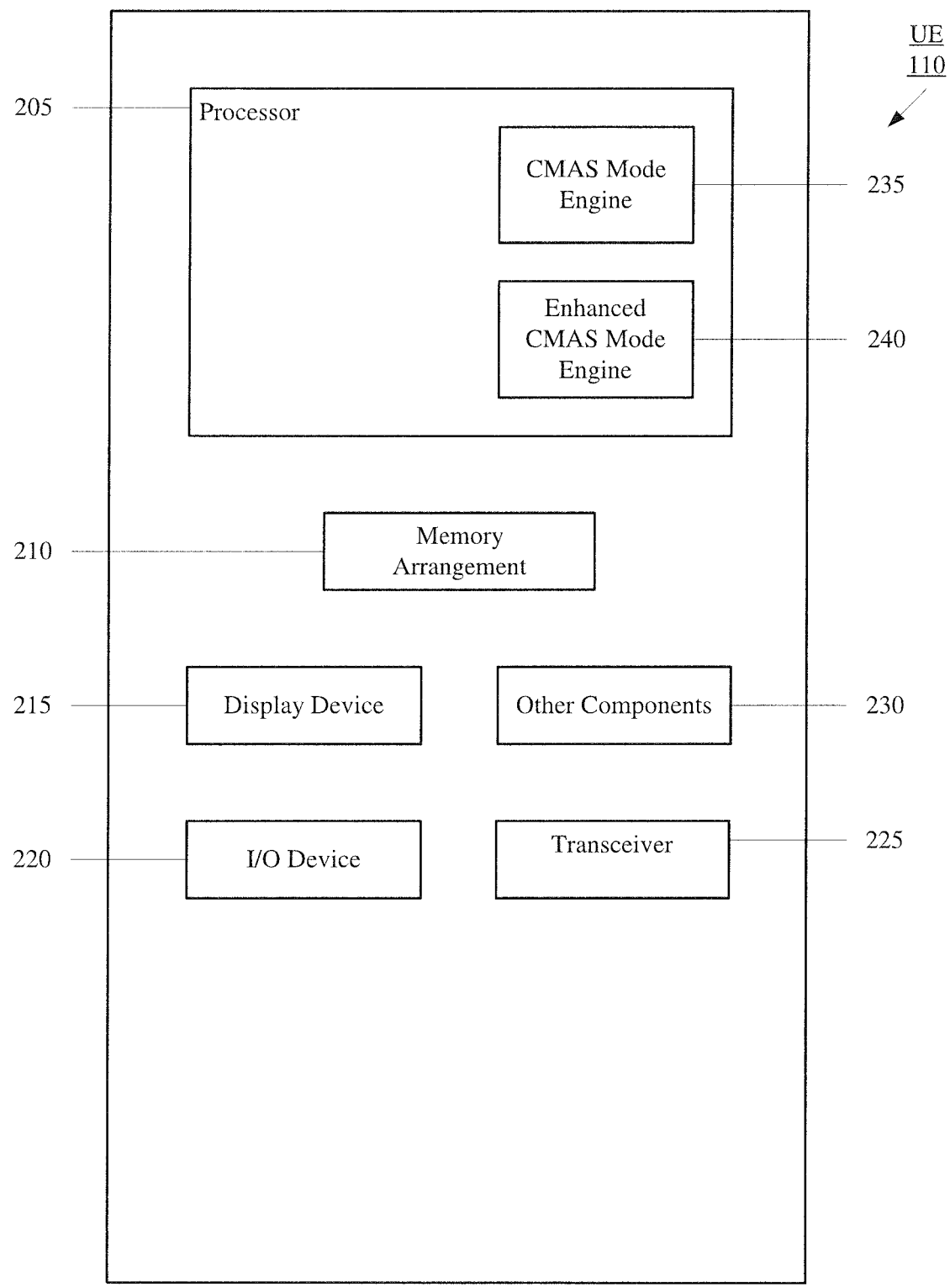
FIG. 2 shows an exemplary UE according to various exemplary embodiments described herein.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a CMAS mode engine 235 and an enhanced CMAS mode engine 240. The CMAS mode engine 235 may be configured to activate and deactivate CMAS mode. For example, the CMAS mode engine 235 may identify various predetermined conditions that indicate that the UE 110 is experiencing poor radio conditions. Accordingly, to conserve power, the CMAS mode engine 235 may activate CMAS mode. When in CMAS mode, the CMAS mode engine 235 may identify various predetermined conditions that indicate that the UE 110 is experiencing adequate radio conditions. Accordingly, to resume access to services, the CMAS mode engine 235 may deactivate CMAS mode. The enhanced CMAS mode engine 240 may be configured to activate and deactivate enhanced CMAS mode. For example, the enhanced CMAS mode engine 240 may identify that the UE 110 is likely to perform excessive signaling. To prevent excessive signaling, the enhanced CMAS mode engine 240 may bar the transmission of particular signals.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with the conditions of the UE 110 when a determination of the operating mode is performed. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122, the legacy RAN 124, the WLAN 126, etc. Accordingly, the transceiver 225 may operate on a variety of different frequencies or channels (e.g., set of consecutive frequencies).

CMAS mode is a power efficient mode of operation and thus, activating CMAS mode may provide power saving benefits to the UE 110. However, when radio conditions fluctuate between poor and adequate, the UE 110 may get stuck in a cycle of activating/deactivating CMAS mode relatively frequently causing excessive signaling between the UE 110 and the currently camped cell. In conventional systems, the intended power saving benefits of CMAS mode may be negated by the excessive signaling. Accordingly, the exemplary embodiments may relate to identifying when excessive signaling is likely to be performed and utilizing an enhanced CMAS mode to prevent excessive signaling.

Figure 3:
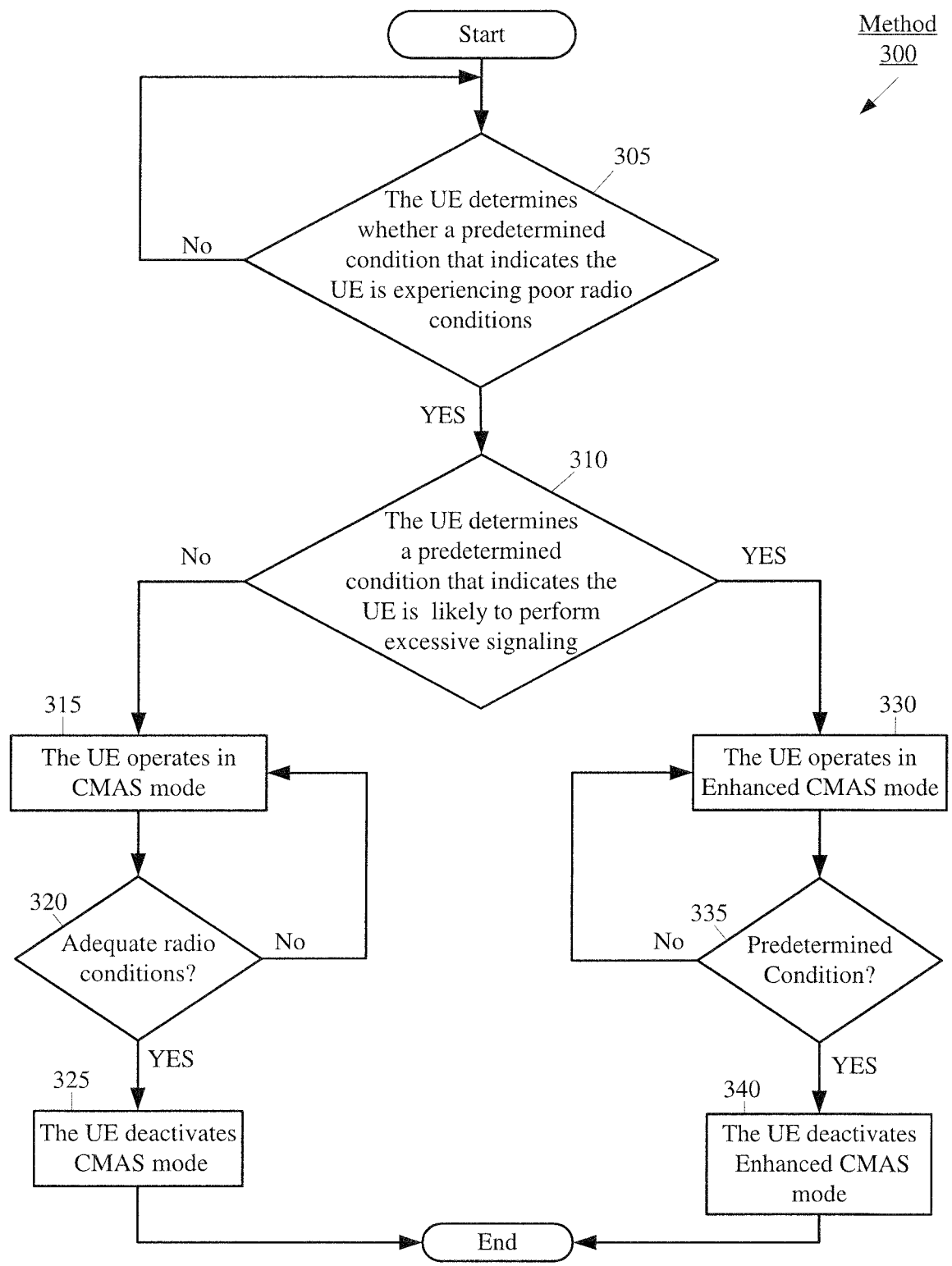
FIG. 3 shows an exemplary method for the UE to determine whether to activate CMAS mode or to activate enhanced CMAS mode according to various exemplary embodiments.

FIG. 3 shows an exemplary method 300 for the UE 110 to determine whether to activate CMAS mode or to activate enhanced CMAS mode according to various exemplary embodiments. The method 300 will be described with regard to the network arrangement 100 of FIG. 1 and the UE 110 of FIG. 2.

Consider an exemplary scenario where the UE 110 is experiencing adequate radio conditions. Accordingly, the UE 110 has access to the full scope of services normally available to the UE 110 via the network connection. This may be referred to as a "full service" condition.

In 305, the UE 110 determines whether a predetermined condition that indicates that the UE 110 is experiencing poor radio conditions. Thus, in 305 the UE 110 determines whether the radio conditions degrade from adequate to poor. In one exemplary embodiment, the predetermined condition may include whether a reference signal received power (RSRP) satisfies a predetermined threshold. Examples of predetermined threshold values may include but are not limited to, −90 dBm, −120 dBm, −150 dBm, etc. However, reference to RSRP and specific RSRP values are merely provided for illustrative purposes, any appropriate measurement or data such as but not limited to, reference signal received quality (RSRQ), signal-to-noise ratio (SNR), etc. may at least be a factor in triggering CMAS mode.

In another exemplary embodiment, the predetermined condition may include whether the UE 110 is utilizing a high transmission power cost. The high transmission power cost may be considered a high energy-per-bit cost for uplink data. This high transmission power cost may be determined based on one or more parameters. For example, one parameter may relate to transmission power. Thus, the predetermined condition may include whether transmission power satisfies a predetermined threshold which may be set to values including but not limited to, 5 dBm, 10 dBm, 20 dBm, 22 dBm, 35 dBm, etc. Another exemplary parameter may relate to retransmissions. Thus, the predetermined condition may include whether a number of retransmissions satisfies a predetermined threshold which may be set to values including but not limited to, 2, 3, 5, 7, 8, 10, etc. However, reference to transmission power and a number of retransmissions is merely exemplary, the UE 110 may utilize any appropriate transmission parameter to determine whether the UE 110 is utilizing a high transmission power cost. Any of these predetermined thresholds may be based on a single occurrence or based on average values within a predetermined duration. Accordingly, the UE 110 may determine that the UE 110 is experiencing poor radio conditions based on the RSRP threshold, the transmission power threshold, the retransmission threshold or any combination, or any appropriate predetermined condition.

If the predetermined condition in 305 is not satisfied, this may indicate the UE 110 is still experiencing adequate radio conditions. Thus, the UE 110 may continue to be in a full service condition. Accordingly, the UE 110 may continue to monitor measurement data and/or transmission parameters to determine whether the radio conditions subsequently degrade.

If the predetermined condition in 305 is satisfied the method 300 continues to 310. In 310, the UE 110 determines whether a predetermined condition that indicates that the UE 110 is likely to perform excessive signaling is satisfied. This predetermined condition may relate to whether the UE 110 has previously activated CMAS mode and/or transmitted a signal that is intended to cause the release of the bearer between the UE 110 and the IMS 150. In one exemplary embodiment, the predetermined condition may include whether a PDN disconnect request has been sent to the network a predetermined number of times within a predetermined duration. Since this signal may be included in the process of activating CMAS mode, this may indicate that the UE 110 has been experiencing conditions that have been causing the UE 110 to activate and deactivate CMAS mode relatively frequently within a short time period. Thus, the predetermined condition in 310 may enable the UE 110 to identify behavior that may precede excessive signaling. In one exemplary configuration, the predetermined number of transmissions may be set to three PDN disconnect requests and the predetermined duration may be set to one minute. However, these values are merely provided for illustrative purpose. The number of PDN disconnect requests may be set to one, two, four, five, seven, ten, etc. The predetermined duration may be set to ten seconds, thirty seconds, one minute, one minute thirty seconds, two minutes, four minutes, 5 minutes, ten minutes, etc.

In another exemplary embodiment, the predetermined condition that indicates that the UE 110 is likely to perform excessive signaling may include whether an IMS deregistration message has been sent to the IMS 150 a predetermined number of times within a predetermined duration. Since this signal may also be included in the process of activating CMAS mode, this may also indicate that the UE 110 has been experiencing conditions that have been causing the UE 110 to activate and deactivate CMAS mode relatively frequently within a short time period. In one exemplary configuration, the predetermined condition may be set to three IMS deregistration messages being transmitted within one minute. However, these values are merely provided for illustrative purpose. Setting the predetermined conditions to be based on PDN disconnect requests and/or IMS deregistration messages is merely provided for illustrative purposes. Different networks and/or different chipset providers may refer to similar signaling by a different name.

If the predetermined condition is not satisfied in 310 the method 300 continues to 315. In 315, the UE 110 operates in CMAS mode. As mentioned above, activating CMAS mode may include the UE 110 transmitting a signal that is intended to cause the release of the bearer between the UE 110 and the IMS 150. When in CMAS mode, the UE 110 may provide power saving benefits by limiting the processing of non-critical/background data traffic and limiting the processing of foreground/user initiated traffic. For example, incoming data may be analyzed and only emergency related data may be used for subsequent processing while non-emergency related data may be ignored or buffered for later use.

When the UE 110 operates in CMAS mode the UE 110 may store CMAS mode related information. The CMAS mode related information may provide an indication as to when the UE 110 has activated CMAS mode. The UE 110 may reference the CMAS mode related information when the UE 110 determines whether the predetermined condition in 305 is satisfied. For example, the UE 110 may store an indication that the UE 110 transmitted a PDN disconnect request and/or an IMS deregistration message including time stamps as to when these requests/messages were sent. The UE 110 may utilize a counter to track the number of times these signals have been transmitted and/or the number of times the UE 110 has activated CMAS mode. The UE 110 may also utilize a timer to track when these signals were transmitted relative to one another. However, this is merely exemplary, the UE 110 may store indications corresponding to when the UE 110 has activated CMAS mode and/or transmitted particular signals in any appropriate manner.

In 320, the UE 110 determines whether a predetermined condition that indicates that the UE 110 is experiencing adequate radio conditions is satisfied. Since CMAS mode limits the services available to the UE 110, the UE 110 monitors for this predetermined condition to determine when the UE 110 may reestablish access to the services that may be limited in CMAS mode. This determination is similar to the determination made in 305 but instead of the UE 110 determining whether the radio conditions have degraded, here, the UE 110 determines whether the radio condition have improved. Accordingly, the predetermined condition may include but is not limited to, an RSRP threshold, a transmission power threshold, a retransmissions threshold or a combination thereof. The UE 110 may be configured to utilize the same factors or different factors when making the determinations in 305 and 320. Further, the UE 110 may be configured to utilize the same threshold values or different threshold values when making the determinations in 305 and 320.

If the predetermined condition is not satisfied in 320, this indicates that the UE 110 is still experiencing poor radio conditions. Accordingly, the method 300 returns to 315 and the UE 110 continues to operate in CMAS mode.

If the predetermined condition is satisfied, the method 300 continues to 325. In 325, the UE 110 deactivates CMAS mode. Deactivating CMAS mode may include the UE 110 transmitting a signal to the network that is intended to establish a bearer between the UE 110 and the IME 150. Since CMAS mode may limit the services available to the UE 110, deactivating CMAS mode may enable to the UE 110 to regain access to services that may have been limited in CMAS mode, e.g., enter a full service condition.

Returning to 310, if the predetermined condition is satisfied in 310 the method 300 continues to 330 where the UE 110 operates in enhanced CMAS mode. Subsequently, 335 and 340 relate to deactivating enhanced CMAS mode. Operating in enhanced CMAS mode and deactivating enhanced CMAS mode will be described generally with regard to FIG. 3. Operating in enhanced CMAS mode and determining when to deactivate enhanced CMAS mode will be described in further detail with regard to FIG. 4.

Operating in enhanced CMAS mode in 330 may include the UE 110 utilizing the same power saving mechanisms of CMAS mode. However, when the UE 110 is in enhanced CMAS mode, unlike CMAS mode, the UE 110 is configured to bar signals intended to cause the release of the bearer between the UE 110 and the IMS 150. For example, the UE 110 may prevent the baseband processor from transmitting a PDN disconnect request to the network and/or the UE 110 may prevent the IMS protocol stack from sending IMS deregistration messages to the IMS 150. Thus, in enhanced CMAS mode, from the perspective of the UE 110, the UE 110 is operating in CMAS mode. From the network perspective, the bearer between the UE 110 and the IMS 150 still exists. Barring a signal at the baseband processor or the IMS protocol stack is merely exemplary. When in enhanced CMAS mode, the UE 110 may bar the transmission of these signals in any appropriate manner.

In 335, the UE 110 determines whether a predetermined condition has been satisfied. The predetermined condition may indicate that the UE 110 is no longer likely to perform excessive signaling. For example, the predetermined condition may relate to whether the radio conditions experienced by the UE 110 have improved. Further, the predetermined condition may include a time factor that may indicate to the UE 110 that despite not identifying an improvement in the radio conditions, the cause of the UE 110 activating/deactivating CMAS mode has likely been resolved. Accordingly, the predetermined condition may include but is not limited to, an RSRP threshold, a transmission power threshold, a retransmissions threshold, a timer, the UE 110 being configured to camp on a new cell or a combination thereof. If the predetermined condition is not satisfied, the UE 110 returns to 330 where the UE 110 remains in enhanced CMAS mode.

If the predetermined condition in 335 is satisfied, the method 300 continues to 340. In 340, the UE 110 deactivates enhanced CMAS mode. When the UE 110 deactivates enhanced CMAS mode, the UE 110 may be able to reestablish access to services that were limited in enhanced CMAS mode e.g., enter full service condition. However, as mentioned above, the predetermined condition in 335 may include a time factor. Therefore, the UE 110 may also be triggered to deactivate enhanced CMAS mode despite being in poor radio conditions. Accordingly, when the UE 110 deactivates enhanced CMAS mode, the UE 110 may be triggered to activate CMAS mode due to the poor radio conditions.

Figure 4:
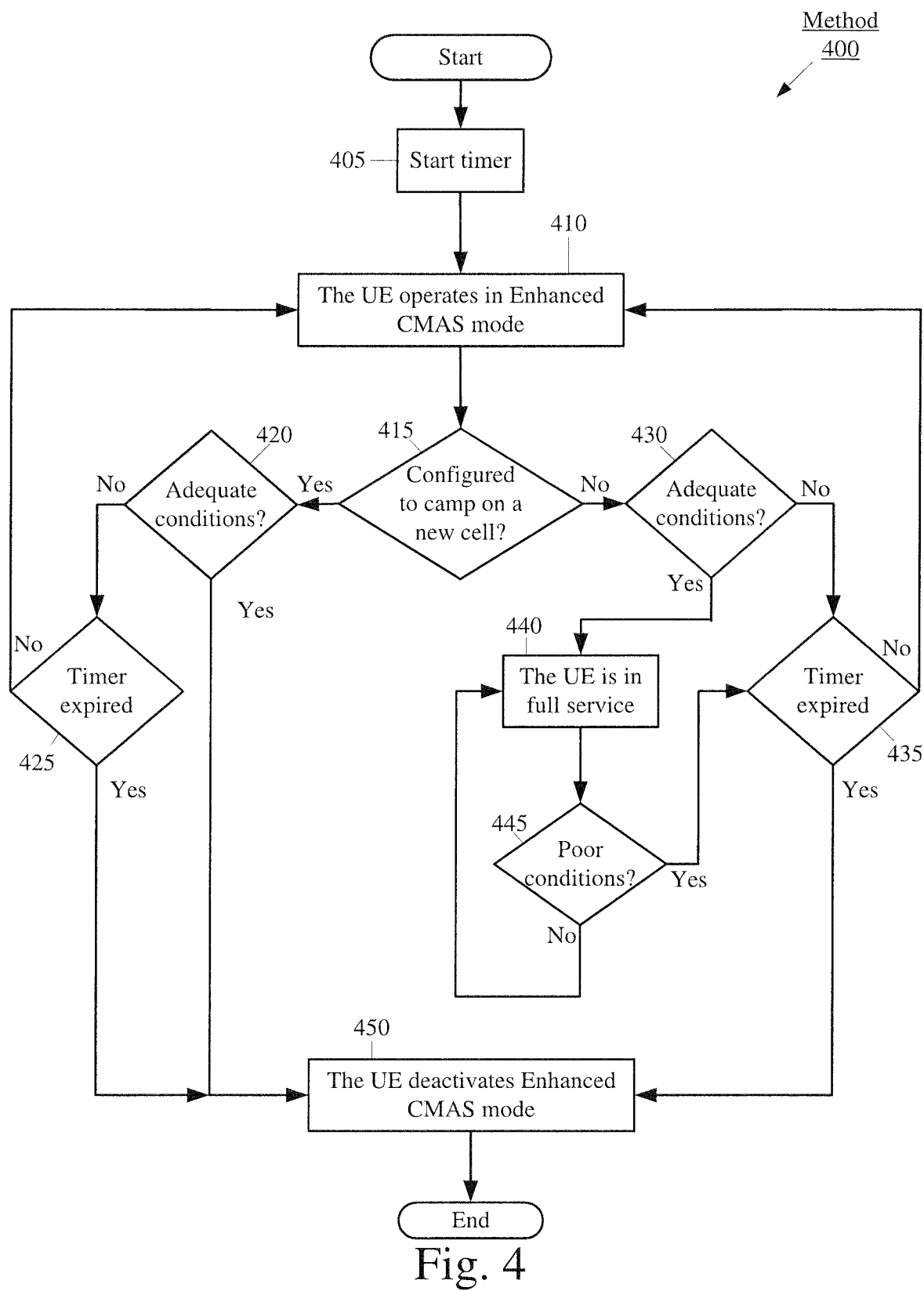
FIG. 4 shows an exemplary method for the UE to operate in enhanced CMAS mode according to various exemplary embodiments.

FIG. 4 shows an exemplary method 400 for the UE 110 to operate in enhanced CMAS mode according to various exemplary embodiments. The method 400 will be described with regard to the network arrangement 100 of FIG. 1, the UE 110 of FIG. 2 and the method 300 of FIG. 3.

Consider an exemplary scenario where the UE 110 has activated enhanced CMAS mode. As described above with regard to 310 of the method 300, the UE 110 may activate enhanced CMAS mode if the UE 110 determines that a predetermined condition that indicates that the UE 110 is likely to perform excessive signaling is satisfied. This may include determining whether a predetermined number of PDN disconnect requests and/or IMS deregistration messages have been transmitted within a predetermined duration. When in enhanced CMAS mode, the UE 110 may utilize the power saving mechanisms of CMAS mode such as ignoring particular signals and only processing emergency messages. However, unlike CMAS mode, the UE 110 bars the transmission of signals that are intended to cause the release of the bearer between the UE 110 and the IMS 150. From the UE 110 perspective the UE 110 is operating in CMAS mode. From the network perspective, the bearer between the UE 110 and the IMS still exists. Accordingly, in enhanced CMAS mode, signals received over the bearer from the IMS 150 may be ignored due to the power saving mechanisms that may be implemented by the UE 110 when operating in enhanced CMAS mode. Since the bearer still exists, when the UE 110 deactivates enhanced CMAS mode, the UE 110 may reestablish a full service condition without having to perform signaling related to reestablishing the bearer (e.g., PDN connectivity request, IMS reregistration message, etc.).

In 405, the UE 110 starts a timer. During the duration of the timer, the UE 110 may be configured to operate in enhanced CMAS mode. When the timer expires, the UE 110 may be configured to deactivate enhanced CMAS mode. Accordingly, the expiration of the timer may indicate to the UE 110 that despite not identifying an improvement in radio conditions, the cause of the UE 110 activating/deactivating CMAS mode has likely been resolved and thus, deactivating enhanced CMAS mode may either result in attempting to reestablish a full service condition or activating CMAS mode.

In one exemplary embodiment the length of the timer may be set to five minutes. However, this is merely provided for illustrative purposes. The timer may be configured to be any appropriate duration (e.g., thirty seconds, one minute, one minute thirty second, two minutes, two minutes forty-five seconds, four minutes, five minutes, ten minutes, etc.). The UE 110 may set the length of the timer based on a variety different factors. For instance, the length of the timer may be based on previous interactions with the currently camped cell by the UE 110 or other UEs, previous interactions with other cells by the UE or other UEs, the speed and/or direction in which the UE 110 is traveling, information received from the network, the configuration of surrounding cells, a look up table managed by the network or a provider, historical data, testing data, or any other appropriate basis.

In 410, the UE 110 operates in enhanced CMAS mode. As mentioned above, in enhanced CMAS mode, the UE 110 may utilize the same power saving mechanisms utilized in CMAS mode. However, unlike CMAS mode, the UE 110 may bar the transmission of signals that are intended to cause the bearer between the UE 110 and the IMS 150 to be released (e.g., PDN disconnect request, IMS deregistration, etc.).

In 415, the UE 110 determines whether the UE 110 has been configured to camp on a new cell. For example, consider an exemplary scenario where the UE 110 is currently camped on the eNB 120A. The UE 110 may collect measurement data and be triggered to perform cell reselection while a handoff of the UE 110 from the eNB 120A to the eNB 120B may be initiated. As a result, the UE 110 may be now camped on the eNB 120B.

If the UE 110 has been configured to camp on a new cell in 415, the method 400 continues to 420. In 420, the UE 110 determines whether a predetermined condition that indicates that the UE 110 is within adequate radio conditions is satisfied. Since the UE 110 may have activated enhanced CMAS mode because the UE 110 experienced poor radio conditions, the UE 110 may utilize the predetermined condition in 420 to ensure that radio conditions of the new cell are adequate to reestablish access to a full service condition. Thus, the determination in 420 may be similar to the determinations made in 305 and 320 of FIG. 3. Accordingly, the predetermined condition may include but is not limited to, an RSRP threshold, a transmission power threshold, a retransmissions threshold, a combination thereof, etc.

If the UE 110 determines that the predetermined condition in 420 is satisfied, the method 400 continues to 450 where enhanced CMAS mode is deactivated. When enhanced CMAS mode is deactivated in response to the determination made in 420, the UE 110 is camped on a cell that provide adequate radio conditions. Accordingly, the UE 110 may reestablish access to services that were limited during enhanced CMAS mode.

If the UE 110 determines that the predetermined condition in 425 is not satisfied, the method 400 continues to 425. In 425 the UE 110 determines whether the timer has expired.

In 425, if the timer has not expired the method 400 returns to 410 where the UE 110 continues to operate in enhanced CMAS mode while camped on the new cell 120B. If the timer has expired, the method 400 continues to 450 where enhanced CMAS mode is deactivated. When enhanced CMAS mode is deactivated in response to the expiration of the timer started in 405, the radio conditions may cause the UE 110 to subsequently enter CMAS mode. However, due to the duration of the timer, the conditions that caused the UE 110 to transmit a signal that is intended to cause the release of the bearer between the UE 110 and the IMS 150 enough times within a predetermined duration to satisfy 310 and thus, activate enhanced CMAS mode may no longer be experienced by the UE 110. However, if those conditions remain, the UE 110 may once again utilize the predetermined condition of 310 and trigger the activation of enhanced CMAS mode to avoid excessive signaling.

Returning to 415, if the UE 110 was not configured to camp on a new cell, the method 400 continues to 430. In 430, the UE 110 determines whether a predetermined condition that indicates that the UE 110 is within adequate radio conditions is satisfied. Since the UE 110 may have activated enhanced CMAS mode because the UE 110 experienced poor radio conditions, the UE 110 may utilize the predetermined condition in 430 to determine whether the radio conditions of the currently camped cell have improved and a full service condition may be reestablish. Thus, the determination in 430 may be similar to the determinations made in 420 and 305, 320 of FIG. 3.

If the predetermined condition in 430 is not satisfied, the method 400 continues to 435. In 435, the UE 110 determines whether the timer has expired.

In 435, if the timer has not expired the method 400 returns to 410 where the UE 110 continues to operate in enhanced CMAS mode. If the timer has expired the method 400 continues to 450 where enhanced CMAS mode is deactivated. Similar to 425, when enhanced CMAS mode is deactivated in response to the expiration of the timer started in 405, the radio conditions may cause the UE 110 to subsequently enter CMAS mode. However, due to the duration of the timer, the conditions that caused the UE 110 to transmit a signal that is intended to cause the release of the bearer between the UE 110 and the IMS 150 enough times within a predetermined duration to satisfy 310 and thus, activate enhanced CMAS mode may no longer be experienced by the UE 110. However, if those conditions remain, the UE 110 may once again utilize the predetermined condition of 310 and trigger the activation of enhanced CMAS mode to avoid excessive signaling.

Returning to 430, if the predetermined condition in 430 is satisfied the method 400 continues to 440. In 440, since the radio condition are adequate, the UE 110 may cease the utilization of any CMAS mode power saving mechanisms and may reestablish access to services that may have been limited in enhanced CMAS mode. Accordingly, the UE 110 is in full service. However, the UE 110 has not triggered the deactivation of enhanced CMAS mode.

In 445, the UE 110 determines whether a predetermined condition that indicates that the UE 110 is experiencing poor radio conditions is satisfied. Thus, the determination in 430 may be similar to the determinations made in 420, 430 and 305, 320 of FIG. 3.

If the UE 110 determines that the predetermined condition in 445 is not satisfied, this indicates to the UE 110 that the radio conditions are still adequate and thus, the UE 110 remains in full service. If the predetermined condition in 445 is satisfied, the method 400 continues to 435. As mentioned above, in 435 the UE 110 determines whether the timer has expired. If the UE 110 determines that the timer has not expired in 435, the method 400 returns to 410 where the UE 110 operates in enhanced CMAS mode. If the UE 110 determines that the timer has expired in 435, the method 400 continues to 450 where enhanced CMAS mode is deactivated. When enhanced CMAS mode is deactivated in response to the expiration of the timer started in 405, the radio conditions may cause the UE 110 to subsequently enter CMAS mode. However, due to the duration of the timer, the conditions that caused the UE 110 to transmit a signal that is intended to cause the release of the bearer between the UE 110 and the IMS 150 enough times within a predetermined duration to satisfy 310 and thus, activate enhanced CMAS mode may no longer be experienced by the UE 110. However, if those conditions remain, the UE 110 may once again utilize the predetermined condition of 310 and trigger the activation of enhanced CMAS mode to avoid excessive signaling.

As mentioned above, in 450 the UE 110 deactivates enhanced CMAS mode. The method 400 described a plurality of different configurations that may cause the UE 110 to deactivate enhanced CMAS mode. When the UE 110 is in enhanced CMAS mode, from the network perspective, the bearer between the UE 110 and the IMS 150 still exists. Thus, the IMS 150 may have attempted to send control information and/or data to the UE 110 over the bearer. Since a power saving mechanism may include the UE ignoring received signals that are not emergency related, the IMS 150 may not receive a response to signals sent to the UE 110 over the bearer. This may cause the IMS 150 to delete stored UE 110 context information and effectively release the bearer between the UE 110 and the IMS 150. Accordingly, when the UE 110 deactivates CMAS mode, the UE 110 may trigger an IMS reregistration process to bring the UE 110 context stored in the IMS 150 up to date and reestablish access to services normally provided by the IMS 150. The UE 110 may be configured with a timer that triggers the UE 110 to send an IMS reregistration message to the IMS 150 periodically. When the UE 110 send the IMS reregistration message to the IMS 150 upon the deactivation of enhanced CMAS mode the UE 110 may reset this timer.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at a user equipment (UE) configured to camp on a first cell to establish a connection to a first network:
       determining a first predetermined condition related to radio conditions between the UE and the first cell is satisfied; and
       determining whether to activate a first mode of operation or a second mode of operation based on a second predetermined condition, wherein the first mode of operation includes transmitting a signal that is intended to cause the release of a bearer between the UE and a packet data network (PDN) and the second mode of operation includes barring the transmission of the signal that is intended to cause the release of the bearer between the UE and the PDN, the second predetei mined condition relating to a number of times the signal that is intended to cause the release of the bearer between the UE and the PDN was previously transmitted.

2. The method of claim 1, further comprising:
when the second mode of operation is activated, setting a timer to a predetermined duration;
determining whether a third predetermined condition is satisfied; and
when the third predetermined condition is satisfied, deactivating the second mode of operation.

3. The method of claim 2, wherein the third predetermined condition is related to whether the predetermined duration of the timer has expired.

4. The method of claim 2, wherein the third predetermined condition is related to whether measurement data corresponding to the first cell satisfies a predetermined threshold.

5. The method of claim 2, wherein the third predetermined condition is related to whether a cell reselection from the first cell to a second cell has occurred.

6. The method of claim 5, wherein the third predetermined condition is related to whether measurement data corresponding to the second cell satisfies a predetermined threshold.

7. The method of claim 2, wherein deactivating the second mode of operations comprises sending an IP multimedia subsystem (IMS) reregistration message.

8. The method of claim 1, wherein the first predetermined condition includes at least one of a measurement data threshold and a transmission parameter threshold.

9. The method of claim 1, wherein the second predetermined condition relates to the number of times the signal that is intended to cause the release of the bearer between the UE and the PDN has been transmitted within a predetermined duration.

10. The method of claim 1, wherein barring the transmission of the signal that is intended to cause the release of the bearer between the UE and the PDN is based on preventing a baseband processor of the UE from transmitting the signal to the network.

11. The method of claim 1, wherein the signal that is intended to cause the release of the bearer between the UE and the PDN comprises one of a PDN disconnect request or an IP multimedia subsystem (IMS) deregistration message.

12. A user equipment (UE), comprising:
a transceiver configured to establish a connection to a first network via a first cell; and
a processor configured to perform operations comprising:
determine a first predetermined condition related to radio conditions between the UE and the first cell is satisfied; and
determine whether to activate a first mode of operation or a second mode of operation based on a second predetermined condition, wherein the first mode of operation includes transmitting a signal that is intended to cause the release of a bearer between the UE and a packet data network (PDN) and the second mode of operation includes barring the transmission of the signal that is intended to cause the release of the bearer between the UE and the PDN, the second predetermined condition relating to a number of times the signal that is intended to cause the release of the bearer between the UE and the PDN was previously transmitted.

13. The UE of claim 12, wherein the first predetermined condition includes at least one of a measurement data threshold and a transmission parameter threshold.

14. The UE of claim 12, wherein the second predetermined condition relates to the number of times the signal that is intended to cause the release of the bearer between the UE and the PDN has been transmitted within a predetermined duration.

15. The method of claim 12, the operations further comprising:
when the second mode of operation is activated, set a timer to a predetermined duration;
determine whether a third predetermined condition is satisfied; and
when the third predetermined condition is satisfied, deactivate the second mode of operation.

16. The method of claim 15, wherein deactivating the second mode of operation includes transmitting a IP multimedia subsystem (IMS) reregistration message.

17. The method of claim 15, wherein the third predetermined condition is related to whether the UE is to connect to the first network via a second cell and whether measurement data corresponding to the second cell satisfies a predetermined threshold.

18. The method of claim 15, wherein the third predetermined condition is related to whether the predetermined duration of the timer has expired.

19. An integrated circuit for a user equipment (UE), comprising:
circuitry configured to establish a connection for the UE to a first network via a first cell;
circuitry configured to determine a first predetermined condition related to radio conditions between the UE and the first cell is satisfied; and
circuitry configured to determine whether to activate a first mode of operation or a second mode of operation for the UE based on a second predetermined condition, wherein the first mode of operation includes the UE transmitting a signal that is intended to cause the release of a bearer between the UE and a packet data network (PDN) and the second mode of operation includes barring the transmission of the signal that is intended to cause the release of the bearer between the UE and the PDN, the second predetermined condition relating to a number of times the signal that is intended to cause the release of the bearer between the UE and the PDN was previously transmitted.

20. The integrated circuit of claim 19, wherein the signal that is intended to cause the release of the bearer between the UE and the PDN is one of a PDN disconnect request or a IP multimedia subsystem (IMS) deregistration message.

* * * * *

UNITED STATES PATENT AND TRADEMARK OFFICE
CERTIFICATE OF CORRECTION

PATENT NO. : 10,904,945 B2  
APPLICATION NO. : 16/157715  
DATED : January 26, 2021  
INVENTOR(S) : Prabhakar et al.

Page 1 of 1

It is certified that error appears in the above-identified patent and that said Letters Patent is hereby corrected as shown below:

In the Claims

Claim 1, Column 15, Lines 6:
"predetei mined condition relating to a number of" should read "predetermined condition relating to a number of"

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*